United States Patent
Nakahara et al.

(10) Patent No.: US 8,592,000 B2
(45) Date of Patent: Nov. 26, 2013

(54) MULTILAYER COATING FILM-FORMING METHOD

(75) Inventors: Shuichi Nakahara, Miyosi (JP); Hiroshi Murata, Miyosi (JP); Yuta Nodera, Miyosi (JP); Junya Ogawa, Toyota (JP); Yukinori Nasu, Toyota (JP)

(73) Assignees: Kansai Paint Co., Ltd., Hyogo-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 3 days.

(21) Appl. No.: 12/656,269

(22) Filed: Jan. 22, 2010

(65) Prior Publication Data

US 2010/0189905 A1    Jul. 29, 2010

(30) Foreign Application Priority Data

Jan. 23, 2009  (JP) ................. 2009-013662

(51) Int. Cl.
- *B05D 5/00* (2006.01)
- *B05D 3/02* (2006.01)
- *B05D 1/02* (2006.01)

(52) U.S. Cl.
USPC ............ 427/402; 427/348; 427/378; 427/379

(58) Field of Classification Search
None
See application file for complete search history.

(56) References Cited

U.S. PATENT DOCUMENTS

| | | | |
|---|---|---|---|
| 5,232,990 A * | 8/1993 | Rehfuss | 525/162 |
| 5,608,004 A | 3/1997 | Toyoda et al. | |
| 6,458,463 B1 | 10/2002 | Yoshioka et al. | |
| 6,635,315 B2 | 10/2003 | Furusawa et al. | |
| 2002/0028297 A1* | 3/2002 | Dattilo | 427/407.1 |
| 2002/0090461 A1 | 7/2002 | Ohmoto et al. | |
| 2002/0107306 A1* | 8/2002 | Wang et al. | 523/412 |
| 2003/0018124 A1* | 1/2003 | Barsotti et al. | 525/64 |
| 2004/0030003 A1* | 2/2004 | Wegner et al. | 523/171 |
| 2007/0077437 A1 | 4/2007 | Kakii et al. | |
| 2009/0087667 A1* | 4/2009 | Tomizaki et al. | 428/413 |

FOREIGN PATENT DOCUMENTS

| | | |
|---|---|---|
| GB | 2 399 520 | 9/2004 |
| JP | 11-236521 | 8/1999 |
| JP | 2002-282773 | 10/2002 |
| JP | 2003-213218 | 7/2003 |
| JP | 2004-275966 | 10/2004 |
| JP | 2006-143963 | 6/2006 |
| WO | 2007/026919 | 3/2007 |
| WO | 2007/145368 | 12/2007 |

OTHER PUBLICATIONS

International Search Report issued Mar. 10, 2009 in International (PCT) Application No. PCT/JP2008/063458, which corresponds to U.S. Appl. No. 12/452,808.

* cited by examiner

*Primary Examiner* — James Lin
*Assistant Examiner* — Francisco Tschen
(74) *Attorney, Agent, or Firm* — Wenderoth, Lind & Ponack, L.L.P.

(57) ABSTRACT

This invention relates to a method of forming multilayer coating film of excellent appearance by 3-coat-1-bake system, comprising successively applying onto a coating object, a water-based intermediate paint, water-based base paint and a clear paint; and then simultaneously heat-curing the resulting 3-layered coating film.

13 Claims, No Drawings

MULTILAYER COATING FILM-FORMING METHOD

TECHNICAL FIELD

This invention relates to a method of forming multilayer coating film having excellent appearance, by a 3-coat-1-bake system comprising successively applying onto a coating object a water-based intermediate paint, water-based base paint and a clear paint, and heat-curing the resulting three-layered multilayer coating film simultaneously.

BACKGROUND ART

For coating car bodies, generally a method of forming a multilayer coating film on an electrocoated coating object by 3-coat-2-bake (3C2B) system has been widely adopted, in which application of an intermediate i curing by baking→application of a water-based base paint→preheating (preliminary heating)→application of a clear paint→curing by baking are successively conducted. In recent years, however, from the viewpoint of energy-saving, 3-coat-1-bake system is attempted, in which the bake-curing step after application of the intermediate paint is omitted, and after applying an electrodeposition paint on a coating object, application of a water-based intermediate paint→preheating (preliminary heating)→application of a water-based base paint→preheating (preliminary heating)→application of a clear paint→curing by baking are successively conducted (see, for example, JP 2002-282773A).

However, in the 3-coat-1-bake system coating, the intermediate paint, base paint and clear paint are applied one on another in uncured state, and layer mixing is apt to occur between adjacent coating films, degrading smoothness or distinctness of image of resulting film in some occasions.

As a countermeasure thereto, JP 2004-275966A discloses a method for forming laminated coating film excelling in finished appearance and chipping resistance, by carrying out the bake-curing step in multi-stages comprising a low-temperature heating stage and high-temperature heating stage under specific temperature and time conditions. However, this coating film-forming method has a problem that sufficient smoothness and distinctness of image are not always obtained when water-based paints are used as the intermediate paint and base paint.

JP 2003-213218A discloses a method for improving the smoothness of a film formed from a thermosetting liquid coating composition, in which, in the occasion of heat curing the coating composition as applied onto a coating object, the storage modulus G' of the film at a stress of 0.5 Pa and a frequency of 0.1 Hz is controlled to fall within a range of about 0.5-20 Pa, the loss modulus G" at a stress of 0.5 Pa and a frequency of 0.1 Hz, to fall within a range of about 1.0-20 Pa, and the storage modulus/loss modulus ratio (G'/G"), to fall within a range of about 0.3-1.0, as measured at the temperature at which the thermal fluidity of the film reaches the maximum before the start of the curing reaction. However, the method is subject to a problem that sufficient smoothness and distinctness of image are not always obtained in the coating by above 3-coat-1-bake system, in particular, by the 3-coat-1-bake system using water-based paints as the intermediate paint and base paint.

SUMMARY OF THE INVENTION

The object of the present invention is to offer a method of forming a multilayer coating film excelling in smoothness and distinctness of image, by 3-coat-1-bake system using water-based intermediate paint and water-based base paint.

We have engaged in concentrative studies with the view to accomplish the above object, to now discover that a multilayer coating film excelling in smoothness and distinctness of image can be formed in the coating process of a multilayer film by 3-coat-1-bake system using a water-based intermediate paint and a water-based base paint, which comprises applying a specific water-based base paint onto an intermediate coating film of which solid content is adjusted to a specific value, adjusting the solid content of the applied film to a specific value, applying thereon a specific clear paint, and curing the intermediate coating film, base coating film and clear coating film simultaneously under specific heating condition. This invention is whereupon completed.

Thus, the present invention offers a method for forming multilayer coating film on a coating object, which is characterized by successively carrying out the following steps (1)-(6):

(1) a step of applying a water-based intermediate paint (X) to form an intermediate coating film, (2) a step of adjusting the solid content of the intermediate coating film which is formed in the step (1) to 70-100 mass %, (3) a step of forming a base coating film by applying onto the intermediate coating film as obtained in the step (2) a water-based base paint (Y) containing 30-55 mass parts, per 100 mass parts of the solid resin content of the paint, of an alcohol solvent having a boiling point of 170-250° C., (4) a step of adjusting the solid content of the base coating film which is formed in the step (3) to 70-100 mass %, (5) a step of forming a clear coating film by applying onto the base coating film as obtained in the step (4) a clear paint (Z) containing 30-70 mass parts of carboxy-containing compound and 70-30 mass parts of polyepoxide, per 100 mass parts of the solid resin content of the paint, the maximum storage modulus (G'1) of the paint, as measured while being kept at 110° C. for 10 minutes at a stress of 0.6 Pa and frequency of 0.1 Hz, falling within a range of 0.001-30 Pa, and (6) a step of curing the intermediate coating film, base coating film and clear coating film, which are formed in the steps (1)-(5), simultaneously, by heating them at 100-120° C. for 3-10 minutes and thereafter further heating them at 130-160° C. for 10-30 minutes.

According to the multilayer coating film-forming method following the present invention, a multilayer coating film excelling in smoothness and distinctness of image can be formed on a coating object by 3-coat-1-bake system.

EMBODIMENTS FOR WORKING THE INVENTION

Hereinafter the multilayer coating film-forming method of the present invention is explained in further details, orderly for each of the steps.

Step (1):

In this step, a water-based intermediate paint (X) is applied onto a coating object to form an intermediate coating film.

Coating Objects

Coating objects to which the water-based intermediate paint (X) is applicable according to the present invention are not particularly limited and, for example, outer panel portions of car bodies such as of automobiles, trucks, motorcycles, buses and the like: car parts; outer panel portions of house electric appliances such as mobile phones, audio instruments and the like can be named. Of these, outer panel portions of cars and car parts are preferred.

Materials of such coating objects are not particularly limited and include, for example, metallic materials such as iron, aluminium, brass, copper, tin plate, stainless steel, zinc-plated steel, zinc alloys (Zn—Al, Zn—Ni, Zn—Fe and the like), and plated steel; plastic materials such as resins, e.g., poyethylene resin, polypropylene resin, acrylonitrile-butadiene-styrene (ABS) resin, polyamide resin, acrylic resin, vinylidene chloride resin, polycarbonate resin, polyurethane resin and epoxy resin, and various FRP's; inorganic materials such as glass, cement, concrete and the like; wood; and fibrous materials (paper, cloth and the like). Of these, metallic materials and plastic materials are preferred.

The coating objects may also be metallic surfaces of such metallic substrates as car bodies made therefrom, said surfaces having been given a surface treatment such as phosphate treatment, chromate treatment, complex oxide treatment or the like. Furthermore, the coating objects may be such metallic substrates or car bodies on which an undercoat of an electrodeposition paint is formed. In particular, car bodies on which an undercoat is formed of a cationic electrodeposition paint are preferred.

Water-Based Intermediate Paint (X)

As the water-based intermediate paint (X) to be applied onto such coating object, a water-based liquid paint composition containing a thermosetting resin component and water, which furthermore is blended with, as necessity arises, coloring pigment, extender, effect pigment, curing catalyst, thickener, UV absorber, light stabilizer, defoamer, plasticizer, organic solvent, surface-regulating agent, antisettling agent and so on, can be used. In the present specification, water-based paint refers to a paint in which the chief component of the solvent used is water.

As the thermosetting resin component, per se known resin compositions comprising a base resin (A) such as polyester resin, acrylic resin, vinyl resin, alkyd resin, urethane resin and the like which contain a crosslinkable functional group such as hydroxy group and a hydrophilic functional group such as carboxy group; and a crosslinking agent (B) such as melamine resin, optionally blocked polyisocyanate compound and the like can be used.

In particular, it is preferred to use as the base resin (A) a hydroxy-containing acrylic resin (A1) and/or hydroxy-containing polyester resin (A2), and as the crosslinking agent (B), an amino resin (B1) and/or blocked polyisocyanate compound (B2).

The hydroxy-containing acrylic resin (A1) can be prepared by, for example, (co)polymerizing at least one unsaturated monomer component comprising a hydroxy-containing unsaturated monomer and optionally other unsaturated monomer(s) which are copolymerizable with the hydroxy-containing monomer under conventional conditions.

The hydroxy-containing unsaturated monomer is a compound having at least one each of hydroxy group and polymerizable unsaturated bond per molecule, examples of which include monoesters of (meth)acrylic acid with $C_{2-8}$ dihydric alcohols such as 2-hydroxyethyl(meth)acrylate, 2-hydroxypropyl(meth)acrylate, 3-hydroxypropyl(meth)acrylate and 4-hydroxybutyl(meth)acrylate; ε-caprolatone modification products of such monoesters of (meth)acrylic acid with $C_{2-8}$ dihydric alcohols; allyl alcohol; and (meth)acrylates having hydroxy-terminated polyoxyethylene chain.

In the present specification, (meth)acrylate refers collectively to acrylate and methacrylate, (meth)acrylic acid refers collectively to acrylic acid and methacrylic acid, (meth)acrylamide refers collectively to acrylamide and methacrylamide, and (meth)acryloyl refers collectively to acryloyl and methacryloyl.

The other unsaturated monomers which are copolymerizable with above hydroxy-containing unsaturated monomers include, for example, alkyl or cycloalkyl(meth)acrylates such as methyl(meth)acrylate, ethyl(meth)acrylate, n-propyl (meth)acrylate, i-propyl(meth)acrylate, n-butyl(meth)acrylate, i-butyl(meth)acrylate, tert-butyl(meth)acrylate, n-hexyl (meth)acrylate, octyl(meth)acrylate, 2-ethylhexyl(meth) acrylate, nonyl(meth)acrylate, tridecyl(meth)acrylate, lauryl (meth)acrylate, stearyl(meth)acrylate, ISOSTEARYL ACRYLATE (tradename, Osaka Organic Chemical Industry, Ltd.), cyclohexyl(meth)acrylate, methylcyclohexyl(meth) acrylate, t-butylcyclohexyl(meth)acrylate, cyclododecyl (meth)acrylate and the like; isobornyl group-containing unsaturated monomers such as isobornyl(meth)acrylate; adamantyl group-containing unsaturated monomers such as adamantyl(meth)acrylate; aromatic ring-containing unsaturated monomers such as styrene, α-methylstyrene, vinyltoluene, phenyl(meth)acrylate and the like; alkoxysilyl group-containing unsaturated monomers such as vinyltrimethoxysilane, vinyltriethoxysilane, vinyltris-(2-methoxyethoxy)silane, γ-(meth)acryloyloxypropyltrimethoxysilane, γ-(meth) acryloyloxypropyltriethoxysilane and the like; perfluoroalkyl(meth)acrylates such as perfluorobutylethyl (meth)acrylate, perfluorooctylethyl(meth)acrylate and the like; unsaturated monomers having fluorinated alkyl groups such as fluoroolefin; unsaturated monomers having photopolymerizable functional groups such as maleimide group; vinyl compounds such as N-vinylpyrrolidone, ethylene, butadiene, chloroprene, vinyl propionate, vinyl acetate and the like; carboxy-containing unsaturated monomers such as (meth)acrylic acid, maleic acid, crotonic acid, β-carboxyethyl acrylate and the like; nitrogen-containing unsaturated monomers such as (meth)acrylonitrile, (meth)acrylamide, dimethylaminopropyl(meth)acrylamide, dimethylaminoethyl(meth)acrylate, adducts of glycidyl(meth)acrylates with amines and the like; epoxy-containing unsaturated monomers such as glycidyl(meth)acrylate, β-methylglycidyl(meth) acrylate, 3,4-epoxycyclohexylmethyl(meth)acrylate, 3,4-epoxycyclohexylethyl(meth)acrylate, 3,4-epoxycyclohexylpropyl(meth)acrylate, allyl glycidyl ether and the like; and (meth)acrylates having alkoxy-terminated polyoxyethylene chain; sulfonic acid group-containing unsaturated monomers such as 2-acrylamido-2-methylpropanesulfonic acid, allylsulfonic acid, sodium salt of styrenesulfonic acid, sulfoethyl methacrylate and sodium salts or ammonium salts thereof; phosphoric acid group-containing unsaturated monomers such as 2-acryloyloxyethyl acid phosphate, 2-methacryloyloxyethyl acid phosphate, 2-acryloyloxypropyl acid phosphate, 2-methacryloyloxypropyl acid phosphate and the like; unsaturated monomers having UV absorbing group such as 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy)-benzophenone, 2,2'-dihydroxy-4-(3-acryloyloxy-2-hydroxypropoxy)-benzophenone, 2-(2'-hydroxy-5'-methacryloyloxyethylphenyl)-2H-benzotriazole and the like; UV-stable unsaturated monomers such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6, 6-tetramethylpiperidine, 4-crotonoylamino-2,2,6,6-tetramethylpiperidine, 1-crotonoyl-4-crotonoyloxy-2,2,6,6-tetramethylpiperidine and the like; and carbonyl group-containing unsaturated monomers such as acrolein, diacetone acrylamide, diacetone methacrylamide, acetoacetoxyethyl methacrylate, formylstyrol, $C_{4-7}$ vinyl alkyl ketones (e.g., vinyl methyl ketone, vinyl ethyl ketone, vinyl butyl ketone) and the like. These can be used either alone or in combination of two or more.

The hydroxy-containing acrylic resin (A1) preferably has a hydroxyl value within a range of generally 1-200 mgKOH/g, in particular, 2-100 mgKOH/g, inter alia, 3-60 mgKOH/g, and an acid value within a range of generally 1-200 mgKOH/g, in particular, 2-150 mgKOH/g, inter alia, 5-100 mgKOH/g, from the viewpoint of storage stability and water resistance of resulting coating film. The hydroxy-containing acrylic resin (A1) furthermore can have a weight-average molecular weight within a range of generally 1,000-5,000,000, in particular, 2,000-3,000,000, inter aha, 3,000-1,000,000.

The blend ratio of such hydroxy-containing acrylic resin (A1) can be generally within a range of 2-90 mass parts, preferably 5-60 mass parts, inter alia, 10-40 mass parts, per 100 mass parts in total of the base resin (A) and curing agent (B) in the water-based intermediate paint (X).

The hydroxy-containing polyester resin (A2) can be prepared, for example, by esterification reaction or ester-interchange reaction of a polybasic acid component with a polyhydric alcohol component, more specifically, for example, by carrying out the esterification reaction in the state wherein the equivalent ratio (COOH/OH) between the carboxy groups in the polybasic acid component and the hydroxy groups in the polyhydric alcohol component is less than 1, i.e., in the state wherein more hydroxy groups than the carboxy groups are present.

The polybasic acid component include compounds having at least two carboxy groups per molecule, for example, polybasic acids such as phthalic acid, isophthalic acid, terephthalic acid, succinic acid, glutaric acid, adipic acid, azelaic acid, sebacic acid, tetrahydrophthalic acid, hexahydrophthalic acid, maleic acid, fumaric acid, itaconic acid, trimellitic acid, pyromellitic acid and the like; anhydrides of these polybasic acids; lower alkyl esters of these polybasic acids and the like. These can be used either alone or in combination of two or more.

The polyhydric alcohol component include compounds having at least two hydroxy groups per molecule, for example, α-glycols such as ethylene glycol, 1,2-propylene glycol, 1,2-butylene glycol, 2,3-butylene glycol, 1,2-hexanediol, 1,2-dihydroxycyclohexane, 3-ethoxypropane-1,2-diol, 3-phenoxypropane-1,2-diol and the like; neopentyl glycol, 2-methyl-1,3-propanediol, 2-methyl-2,4-pentanediol, 3-methyl-1,3-butanediol, 2-ethyl-1-3-hexanediol, 2,2-diethyl-1,3-propanediol, 2,2,4-trimethyl-1,3-pentanediol, 2-butyl-2-ethyl-1,3-propanediol, 2-phenoxypropane-1,3-diol, 2-methyl-2-phenylpropane-1,3-diol, 1,3-propylene glycol, 1,3-butylene glycol, 2-ethyl-1,3-octanediol, 1,3-dihydroxycyclohexane, 1,4-butanediol, 1,4-dihydroxycyclohexane, 1,5-pentanediol, 1,6-hexanediol, 2,5-hexanediol, 3-methyl-1,5-pentanediol, 1,4-dimethylolcyclohexane, tricyclodecanedimethanol, 2,2-dimethyl-3-hydroxypropyl-2,2-dimethyl-3-hydroxypropionate (which is an ester of hydroxypivalic acid with neopentyl glycol), bisphenol A, bisphenol F, bis(4-hydroxyhexyl)-2,2-propane, bis(4-hydroxyhexyl)methane, 3,9-bis(1,1-dimethyl-2-hydroxyethyl)-2,4,8,10-tetroxaspiro[5,5]undecane, diethylene glycol, triethylene glycol, glycerin, diglycerin, triglycerin, pentaerythritol, dipentaerythritol, sorbitol, mannitol, trimethylolethane, trimethylolpropane, ditrimethylolpropane, tris (2-hydroxyethyl)isocyanurate and the like. These can be used either alone or in combination of two or more.

The esterification or ester-interchange reaction of the polybasic acid component with the polyhydric alcohol component can be performed by per se known method, for example, by polycondensation of the polybasic acid component and polyhydric alcohol component at about 180-about 250° C.

The hydroxy-containing polyester resin (A2) may also be modified, either during preparation of the polyester resin or after the esterification reaction, with fatty acid, monoepoxy compound or the like, where necessary. As the fatty acid, for example, coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rape seed oil fatty acid, castor oil fatty acid, dehydrated castor oil fatty acid and safflower oil fatty acid can be named; and as the monoepoxy compound, for example, CARDURA E10P (tradename, HEXION Specialty Chemicals Co., a glycidyl ester of synthetic highly branched saturated fatty acid) can be named.

The hydroxy-containing polyester resin (A2) can have a hydroxyl value within a range of generally 10-300 mgKOH/g, in particular, 25-250 mgKOH/g, inter alia, 50-200 mgKOH/g; and an acid value within a range of generally 1-200 mgKOH/g, in particular, 5-100 mgKOH/g, inter alia, 10-60 mgKOH/g. Furthermore, the hydroxy-containing polyester resin (A2) can have a weight-average molecular weight within a range of generally 500-50,000, in particular, 1,000-40,000, inter alia, 1,500-30,000.

The blend ratio of the hydroxy-containing polyester resin (A2) can normally be within a range of 2-90 mass parts, preferably 10-60 mass parts, inter alia, 15-50 mass parts, per 100 mass parts of the solid resin content of the water-based intermediate paint (X).

In the present specification, "number-average molecular weight" and "weight-average molecular weight" are the values obtained by converting the number-average molecular weight or weight-average molecular weight as measured with gel permeation chromatography (GPC), using the molecular weight of standard polystyrene as the basis. More specifically, the gel permeation chromatography was performed using HLC8120GPC (tradename, Tosoh Corporation) and four columns of TSKgel G-4000HXL, TSKgel G-3000HXL, TSKgel G-2500-HXL and TSKgel G-2000HXL (tradename, Tosoh Corporation) under the conditions of mobile phase, tetrahydrofuran; measuring temp., 40° C.; flow rate, 1 and detector, RI.

The hydroxy-containing acrylic resin (A1) and hydroxyl-containing polyester resin (A2) may be used concurrently with "urethane-modified polyester resin" or "urethane-modified acrylic resin", in which a polyisocyanate compound is extended from a part of the hydroxy groups in the resin by urethanation reaction to give a high molecular weight.

It is furthermore preferred for the hydroxy-containing acrylic resin (A1) and hydroxy-containing polyester resin (A2), with the view to facilitate their solubilizing or dispersing in water, to neutralize a part or all of the carboxy groups which may be contained in them, with a basic compound. Examples of the basic compound include hydroxides of alkali metal or alkaline earth metal such as sodium hydroxide, potassium hydroxide, lithium hydroxide, calcium hydroxide, barium hydroxide and the like; ammonia; primary monoamines such as ethylamine, propylamine, butylamine, benzylamine, monoethanolamine, 2,2-dimethyl-3-amino-1-propanol, 2-aminopropanol, 2-amino-2-methyl-1-propanol, 3-aminopropanol and the like; secondary monoamines such as diethylamine, diethanolamine, di-n-propanolamine, di-iso-propanolamine, N-methylethanolamine, N-ethylethanolamine and the like; tertiary monoamines such as dimethylethanolamine, trimethylamine, triethylamine, triisoproylamine, methyldiethanolamine, 2-(dimethylamino)ethanol and the like; and polyamines such as diethylenetriamine, hydroxyethylaminoethylamine, ethylaminoethylamine, methylaminopropylamine and the like. The use rate of the basic compound can be within a range of normally 0.1-1.5 equivalent, preferably 0.2-1.2 equivalent, to the acid groups in the base resin (A).

On the other hand, as the amino resin (B1), partially or wholly methylolated amino resin obtained through a reaction of amino component such as melamine, urea, benzoguanamine, acetoguanamine, steroguanamine, spiroguanamine, dicyandiamide and the like, with aldehyde component. As the aldehyde, for example, formaldehyde, paraformaldehyde, acetaldehyde, benzaldehyde and the like can be named. Also those formed by partially or wholly etherifying the partially or wholly methylolated amino resins with alcohol can be used. As the alcohol to be used for the etherification, for example, methyl alcohol, ethyl alcohol, n-propyl alcohol, i-propyl alcohol, n-butyl alcohol, i-butyl alcohol, 2-ethylbutanol, 2-ethylhexanol and the like can be named.

As the amino resin (B1), melamine resin is preferred. In particular, methyl-etherified melamine resin formed by partially or wholly etherifying methylol groups in partially or wholly methylolated melamine resin with methyl alcohol; butyl-etherified melamine resin formed by partially or wholly etherifying them with butyl alcohol; and methyl-butyl mixed-etherified melamine resin formed by partially or wholly etherifying them with methyl alcohol and butyl alcohol; are preferred. In particular, methyl-butyl mixed-etherified melamine resin is preferred.

The melamine resin preferably has a weight-average molecular weight within a range of normally 500-5000, in particular, 600-4,000, inter alia, 700-3,000.

When melamine resin is used as the curing agent (B), sulfonic acids such as para-toluenesulfonic acid, dodecylbenzenesulfonic acid and dinonylnaphthalenesulfonic acid; and salts of these acids with amine can be used as the catalyst.

Blocked polyisocyanate compound (B2) is a compound which contains at least two isocyanate groups per molecule, of which isocyanate groups are blocked with such a blocking agent as oxime, phenol, alcohol, lactam, mercaptan and the like.

Suitable blend ratios of the base resin (A) and the crosslinking agent (B) based on the total solid mass of the two are: generally within a range of 40-90%, in particular, 50-80% for the former and generally within a range of 60-10%, in particular, 50-20% for the latter.

As the coloring pigment, for example, titanium oxide, zinc oxide, carbon black, lead sulfate, calcium plumbate, zinc phosphate, aluminum phosphate, zinc molybdate, calcium molybdate, Prussian Blue, Ultramarine Blue, cobalt blue, Phthalocyanine Blue, Indanthrone Blue, lead chromate, synthetic ochre, clear red iron oxide (ochre), bismuth vanadate, Titanium Yellow, zinc yellow, monoazo yellow, isoindolinone yellow, metal complex azo yellow, quinophthalone yellow, benzimidazolone yellow, red iron oxide, red lead, monoazo red, quinacridone red, azo lake (Mn salt), quinacridone magenta, anthanthrone orange, dianthraquinonyl red, perylene maroon, perylene red, diketopyrrolopyrrolechromevermilion, chlorinated Phthalocyanine Green, brominated Phthalocyanine Green, Pyrazolone Orange, benzimidazolone orange, Dioxazine Violet, Perylene Violet and the like can be named. Of these, titanium oxide and carbon black can be conveniently used.

Where the water-based intermediate paint (X) contains such coloring pigment, the blend ratio of the coloring pigment can be within a range of normally 1-120 mass parts, preferably 10-100 mass parts, inter alia, 15-90 mass parts, per 100 mass parts of the solid resin content of the water-based intermediate paint (X).

Also as the extender, for example, clay, kaolin, barium sulfate, barium carbonate, calcium carbonate, talc, silica, alumina white and the like can be named. In particular, use of barium sulfate and/or talc is preferred.

Where the water-based intermediate pigment (X) contains such extender, the blend ratio of the extender normally lies within a range of 1-100 mass parts, preferably 5-60 mass parts, inter alia, 8-40 mass parts, per 100 mass parts of the solid resin content of the water-based intermediate paint (X).

As the effect pigment, for example, non-leafing or leafing type aluminum (including vapor-deposited aluminum), copper, zinc, brass, nickel, glass flake, aluminum oxide, mica, aluminum oxide covered with titanium oxide or iron oxide, mica covered with titanium oxide or iron oxide, hologram pigment and the like can be named, which can be used either alone or in combination of two or more.

Where the water-based intermediate paint (X) contains effect pigment, the blend ratio of the effect pigment is within a range of normally 1-50 mass parts, in particular, 2-30 mass parts, inter alia, 3-20 mass parts, per 100 mass parts of the solid resin content of the water-based intermediate paint (X).

The water-based intermediate paint (X) can be applied onto a coating object by a means known per se, for example, air spray, airless spray, rotary atomizer and the like. During the coating, static electricity may be impressed. Thickness of the coated film can be within a range of normally 10-100 μm, preferably 10-50 μm, inter alia, 15-35 μm, in terms of cured film thickness.

Step (2):

The coating film of the water-based intermediate paint (X) which is formed in the step (1) (hereinafter may be referred to as "intermediate coat") is adjusted of its solid content to fall within a range of 70-100 mass %, in particular, 75-100 mass %, inter alia, 80-100 mass %, before application of a water-based base paint (Y) thereon.

Here the solid content of the intermediate coat can be measured by the following method: first, simultaneously with applying the water-based intermediate paint (X) onto a coating object, the paint (X) is applied also onto a piece of aluminum foil of which mass ($W_1$) was measured in advance. Successively, the aluminum foil after undergoing the same processing like preheating as given to the coating film of the water-based intermediate paint (X) is recovered immediately before application of a water-based base paint (Y) thereonto, and its mass ($W_2$) is measured. Thus recovered aluminum foil is then dried at 110° C. for 60 minutes, allowed to cool off to the room temperature in a desiccator, and its mass ($W_3$) is measured. The solid content is calculated according to the following equation:

$$\text{solid content (mass \%) of intermediate coat} = \{(W_3 - W_1)/(W_2 - W_1)\} \times 100.$$

The adjustment of the solid content of the intermediate coat can be done by such means as preheating, air blowing or the like. The preheating can be normally effected by heating the coated object in a drying oven at about 30-about 100° C., preferably about 40-about 90° C., inter alia, about 60-about 80° C., for around 30 seconds-15 minutes, preferably around 1-10 minutes, inter alia, around 3-5 minutes, either directly or indirectly. The air blowing can be performed by blowing against the coated surface of the coating object air of ambient temperature or heated air of about 25-about 80° C.

Step (3):

Onto the intermediate coat of which solid content has been adjusted in the step (2), then a water-based base paint (Y) is applied.

Water-Based Base Paint (Y)

The water-based base paint (Y) to be used in the invention includes an aqueous liquid composition comprising a thermosetting resin component and water, and furthermore an alcohol solvent having a boiling point at 170-250° C., preferably 180-240° C., within a range of 30-55 mass parts, preferably 35-55 mass parts, per 100 mass parts of the solid resin content in the paint.

As the alcohol solvent having a boiling point at 170-250° C., for example, 1-heptanol, 1-octanol, 2-octanol, 2-ethyl-1-hexanol, 1-decanol, benzyl alcohol, ethylene glycol mono-2-ethyl hexyl ether, propylene glycol mono-2-butyl ether, dipropylene glycol mono-n-butyl ether, tripropylene glycol mono-n-butyl ether, propylene glycol mono-2-ethyl hexyl ether, propylene glycol monophenyl ether and the like can be named. Of these, 1-octanol, 2-octanol, 2-ethyl-1-hexanol and ethylene glycol mono-2-ethyl hexyl ether can be conveniently used.

As the thermosetting resin component, per se known resin compositions for paint as explained as for the water-based intermediate paint (X), which comprise a base resin (A) such as polyester resin, acrylic resin, vinyl resin, alkyd resin, urethane resin and the like having crosslinkable functional group such as hydroxy group and hydrophilic functional group such as carboxy group, and a crosslinking agent (B) such as melamine resin, optionally blocked polyisocyanate compound and the like, can be used.

In particular, it is preferred to use the earlier described hydroxy-containing acrylic resin (A1) and/or hydroxy-containing polyester resin (A2) as the base resin (A), and amino resin (B1) and/or blocked polyisocyanate compound (B2) as the crosslinking agent (B).

The water-based base paint (Y) can further contain, where necessary, conventional additives for paint such as pigment including coloring pigment, extender, effect pigment and the like; curing catalyst, thickener, UV absorber, light stabilizer, defoamer, plasticizer, organic solvent, surface regulating agent, antisettling agent and the like.

In particular, use of effect pigment as at least one constituent of the pigment component enables formation of elaborate metallic or pearlescent coating film and therefore is convenient.

The water-based base paint (Y) can be applied by a means known per se, for example, air spray, airless spray, rotary atomizer or the like. At the time of application, static electricity may be impressed. Thickness of the film can be within a range of normally 5-40 μm, preferably 10-30 μm, in terms of cured film thickness.

Step (4):

The coating film of the water-based base paint (Y) which is formed in the step (3) (hereinafter may be referred to as "base coat") is adjusted of its solid content to fall within a range of 70-100 mass %, in particular, 75-100 mass %, inter alia, 80-100 mass %, before application of a clear paint (Z) thereon.

Here the solid content of the base coat can be measured by the following method: first, simultaneously with applying the water-based base paint (Y) onto the intermediate coat, the paint (Y) is applied also onto a piece of aluminum foil of which mass ($W_4$) was measured in advance. Successively, the aluminum foil after undergoing the same processing like preheating as given to the coating film of the water-based base paint (Y) is recovered immediately before application of a clear paint (Z) thereonto, and its mass ($W_5$) is measured. Thus recovered aluminum foil is then dried at 110° C. for 60 minutes, allowed to cool off to the room temperature in a desiccator, and its mass ($W_6$) is measured. The solid content is calculated according to the following equation:

solid content (mass %) of base coat=$\{(W_6-W_4)/(W_5-W_4)\}\times 100$.

The adjustment of the solid content of the base coat can be done by such means as preheating, air blowing or the like. The preheating temperature can be about 30-about 100° C., preferably about 40-about 90° C., inter alia, about 60-about 80° C., and the preheating time can be around 30 seconds-15 minutes, preferably around 1-10 minutes, inter alia, around 3-5 minutes.

Step (5):

Onto the base coat of which solid content has been adjusted in the step (4), further a clear paint (Z) is applied.

As the clear paint (Z), for example, a clear paint which comprises a carboxy-containing compound within a range of 30-70 mass parts, preferably 35-65 mass parts, inter alia, 40-60 mass parts; and a polyepoxide within a range of 70-30 mass parts, preferably 65-35 mass parts, inter alia, 60-40 mass parts, based on 100 mass parts of the solid resin content of the paint, can be used.

The carboxy-containing compound contains carboxy group in its molecule, and can have an acid value within a range of normally 50-500 mgKOH/g, preferably 80-300 mgKOH/g, inter alia, 100-250 mgKOH/g. From the viewpoint of smoothness of resulting coating film, the carboxy-containing compound preferably has a weight-average molecular weight within a range of normally 2,000-3,000, in particular, 2,200-2,800.

As examples of the carboxy-containing compound, the following polymers (1)-(3) and compound (4) can be named.

Polymer (1): A Polymer Having in its Molecule a Group Formed by Half-Esterification of Acid Anhydride Group Here the group which is formed by half-esterification of acid anhydride group means a group formed of carboxy group and carboxylic acid ester group, obtained by adding an aliphatic monohydric alcohol to acid anhydride group to open the latter's ring (i.e., to half-esterify the same). Hereafter this group may be referred to simply as a half-ester group.

Polymer (1) can be readily obtained, for example, by conventional copolymerization of an unsaturated monomer having half-ester group and other polymerizable unsaturated monomer(s). It can also be readily obtained by similar copolymerization using unsaturated monomer having anhydride group in place of an unsaturated monomer having half-ester group, followed by half-esterification of the acid anhydride group.

As the unsaturated monomer having acid anhydride group, for example, maleic anhydride, itaconic anhydride and the like can be named, and as the unsaturated monomer having half ester group, such unsaturated monomers having acid anhydride group whose acid anhydride group being half-esterified, can be named. As aforesaid, the half-esterification can be performed either before or after the copolymerization.

As the aliphatic monohydric alcohol useful for the half, for example, methanol, ethanol, isopropanol, n-butanol, isobutanol, tert-butanol, ethylene glycol monomethyl ether, ethylene glycol monoethyl ether and the like can be named. The half esterification can be performed according to a conventional method, for example, at temperatures ranging from room temperature to about 80° C., using a tertiary amine as the catalyst where necessary.

Other polymerizable unsaturated monomer include, for example, hydroxy-containing unsaturated monomers, (meth)acrylic acid esters, vinyl ethers or aryl ethers, olefin compounds and diene compounds, hydrocarbon ring-containing unsaturated monomers, nitrogen-containing unsaturated monomers, hydrolyzable alkoxysilyl group-containing acrylic monomers and the like.

Examples of the hydroxy-containing unsaturated monomer include $C_{2-8}$ hydroxyalkyl esters of acrylic acid or methacrylic acid such as 2-hydroxyethyl(meth)acrylate, 3-hydroxypropyl(meth)acrylate, hydroxybutyl(meth)acrylate and the like; monoesters of polyether polyols such as polyethylene glycol, polypropylene glycol, polybutylene glycol and the like with unsaturated carboxylic acids such as (meth)acrylic acid; monoethers of polyether polyols such as polyethylene glycol, polypropylene glycol, polybutylene glycol and the like with hydroxyalkyl(meth)acrylates such as 2-hydroxyethyl(meth)acrylate; monoesters or diesters of acid anhydride group-containing unsaturated compounds such as maleic anhydride or itaconic anhydride with glycols such as ethylene glycol, 1,6-hexanediol, neopentyl glycol and the like; hydroxyalkyl vinyl ethers such as hydroxyethyl vinyl ether; allyl alcohol and the like; 2-hydroxypropyl(meth)acrylate; adducts of α,β-unsaturated carboxylic acid to monoepoxy compounds such as CARDURA E10P (tradename, HEXION Specialty Chemicals Co., a glycidyl ester of synthetic highly branched saturated fatty acid) or α-olefin epoxide; adducts of glycidyl(meth)acrylate to monobasic acids such as acetic acid, propionic acid, p-tert-butylbenzoic acid, fatty acids and the like; and adducts of above hydroxy-containing unsaturated monomers to lactones (e.g., ε-caprolactone, γ-valerolactone).

Examples of (meth)acrylic acid esters include $C_{1-24}$ alkyl or cycloalkyl esters of (meth)acrylic acid such as methyl acrylate, ethyl acrylate, propyl acrylate, isopropyl acrylate, n-butyl acrylate, isobutyl acrylate, tert-butyl acrylate, hexyl acrylate, 2-ethylhexyl acrylate, n-octyl acrylate, decyl acrylate, stearyl acrylate, lauryl acrylate, cyclohexyl acrylate, methyl methacrylate, ethyl methacrylate, n-propyl methacrylate, isopropyl methacrylate, n-butyl methacrylate, isobutyl methacrylate, tert-butyl methacrylate, hexyl methacrylate, 2-ethylhexyl methacrylate, octyl methacrylate, decyl methacrylate, lauryl methacrylate, stearyl methacrylate, cyclohexyl methacrylate and the like; and $C_{2-18}$ alkoxyalkyl esters of acrylic acid or methacrylic acid such methoxybutyl acrylate, methoxybutyl methacrylate, methoxyethyl acrylate, methoxyethyl methacrylate, ethoxybutyl acrylate, ethoxybutyl methacrylate and the like.

Examples of vinyl ether or aryl ether include chain alkyl vinyl ethers such as ethyl vinyl ether, n-propyl vinyl ether, isopropyl vinyl ether, butyl vinyl ether, tert-butyl vinyl ether, pentyl vinyl ether, hexyl vinyl ether, octyl vinyl ether and the like; cycloalkyl vinyl ethers such as cyclopentyl vinyl ether, cyclohexyl vinyl ether and the like; aryl vinyl ethers such as phenyl vinyl ether, trivinyl ether and the like; aralkyl vinyl ethers such as benzyl vinyl ether, phenethyl vinyl ether and the like; and allyl ethers such as allyl ethyl ether.

Examples of olefin compound and diene compound include ethylene, propylene, butylenes, vinyl chloride, butadiene, isoprene, chloroprene and the like.

Examples of hydrocarbon ring-containing unsaturated monomer include styrene, α-methylstyrene, phenyl(meth)acrylate, phenylethyl(meth)acrylate, phenylpropyl(meth)acrylate, benzyl(meth)acrylate, phenoxyethyl(meth)acrylate, cyclohexyl(meth)acrylate, 2-acryloyloxyethyl hydrogenphthalate, 2-acryloyloxypropyl hydrogenphthalate, 2-acryloyloxypropyl hexahydrohydrogenphthalate, 2-acryloyloxypropyl tetrahydrohydrogenphthalate, esters of p-tert-butylbenzoic acid with hydroxyethyl(meth)acrylate, dicyclopentenyl(meth)acrylate and the like.

Examples of the nitrogen-containing unsaturated monomer include nitrogen-containing alkyl(meth)acrylates such as N,N-dimethylaminoethyl(meth)acrylate, N,N-diethylaminoethyl(meth)acrylate, N-t-butylaminoethyl(meth)acrylate and the like; polymerizable amides such as acrylamide, methacrylamide, N-methyl(meth)acrylamide, N-ethyl(meth)acrylamide, N,N-dimethyl(meth)acrylamide, N,N-dimethylaminopropyl(meth)acrylamide, N,N-dimethylaminoethyl(meth)acrylamide and the like; aromatic nitrogen-containing monomers such as 2-vinylpyridine, 1-vinyl-2-pyrrolidone, 4-vinylpyridine and the like; polymerizable nitriles such as acrylonitrile, methacrylonitrile and the like; and allylamine.

Examples of the hydrolyzable alkoxysilyl group-containing acrylic monomer include γ-(meth)acryloyloxypropyltrimethoxysilane, γ-(meth)acryloyloxypropylmethyldimethoxysilane, β-(meth)acryloyloxyethyltrimethoxysilane, γ-(meth)acryloyloxypropyltriethoxysilane, γ-(meth)acryloyloxypropylmethyldiethoxysilane and the like.

The copolymerization of an unsaturated monomer having a half ester group or an acid anhydride group with other polymerizable unsaturated monomer(s) can be carried out by a polymerization method of unsaturated monomers in general, while solution radical polymerization process in an organic solvent is the most suitable, considering its wide applicability and cost. For example, an object polymer can be readily obtained by carrying out the polymerization in a solvent such as aromatic solvent including xylene, toluene and the like; ketone solvent including methyl ethyl ketone, methyl isobutyl ketone and the like; ester solvent including ethyl acetate, butyl acetate, isobutyl acetate, 3-methoxybutyl acetate and the like; and alcohol solvent such as n-butanol, isopropyl alcohol and the like; in the presence of a polymerization initiator including azo catalyst, peroxide catalyst and the like, at temperatures ranging from about 60 to about 150° C.

Suitable copolymerization ratio of the unsaturated monomer having half-ester group or acid anhydride group to the other polymerizable unsaturated monomer(s), based on the combined mass of all the monomers is normally as follows: the unsaturated monomer having half-ester group or acid anhydride group can be within a range of generally 5-40 mass %, preferably 10-30 mass %, from the viewpoint of curability or storage stability; and the other polymerizable unsaturated monomer(s) can be generally within a range of 60-95 mass %, preferably 70-90 mass %. Furthermore, the use rate of styrene among the other polymerizable unsaturated monomers is adequately limited to no more than about 20 mass %, from the viewpoint of weatherability of the cured coating film.

Polymer (2): Vinyl Polymer Having Carboxy Groups in its Molecules

The polymer (2) can be readily obtained by copolymerizing a carboxy-containing unsaturated monomer(s) and other polymerizable unsaturated monomer(s) by a method similar to one applicable to preparation of the polymer (1).

Examples of the carboxy-containing unsaturated monomer include acrylic acid, methacrylic acid, crotonic acid, itaconic acid, maleic acid, fumaric acid, 2-carboxyethyl(meth)acrylate, 2-carboxypropyl(meth)acrylate, 5-carboxypentyl(meth)acrylate and the like; and also examples of the other polymerizable unsaturated monomer include (meth)acrylic acid esters, vinyl ethers or aryl ethers, olefin compounds and diene compounds, hydrocarbon ring-containing unsaturated monomers, nitrogen-containing unsaturated monomers and the like.

Polymer (3): Carboxy-Containing Polyester Polymer

The carboxy-containing polyester polymer can be readily obtained through condensation of polyhydric alcohol such as ethylene glycol, butylene glycol, 1,6-hexanediol, trimethylolpropane, pentaerythritol and the like, with polyvalent carboxylic acid such as adipic acid, terephthalic acid, isophthalic acid, phthalic anhydride, hexahydrophthalic anhydride and the like. For example, a carboxy-containing polyester polymer can be obtained by a single-stage reaction under the conditions that the carboxy groups of the polyvalent carboxylic acid are present in excess. Conversely, a carboxy-containing polyester polymer can also be obtained by first synthesizing a hydroxy-terminated polyester polymer under the conditions that hydroxy groups of the polyhydric alcohol are present in excess and subsequent post-addition thereto of an acid anhydride group-containing compound such as phthalic anhydride, hexahydrophthalic anhydride, succinic anhydride and the like.

Compound (4): Half-Ester Formed by Reaction of Polyol with 1,2-Acid Anhydride

The half-ester can be obtained by reaction of a polyol with 1,2-acid anhydride under such conditions as will induce a ring-opening reaction of the acid anhydride but prevent substantial occurrence of polyesterification reaction. The reaction product generally has a low molecular weight and a narrow molecular weight distribution. The reaction product furthermore shows a low content of volatile organic matter in the paint composition and still gives favorable properties such as excellent acid resistance to the formed coating film.

The half ester can be obtained, for example, through a reaction of polyol with 1,2-acid anhydride in an inert atmosphere, e.g., in nitrogen atmosphere, in the present of a solvent. Suitable solvent includes, for example, ketones such as methyl amyl ketone, diisobutyl ketone, methyl isobutyl ketone and the like; aromatic hydrocarbons such as toluene, xylene and the like; and other organic solvent such as dimethylformamide, N-methylpyrrolidone and the like.

The reaction temperature is preferably low, such as not higher than around 150° C. More specifically, a temperature range of normally about 70-about 150° C., in particular, about 90-about 120° C., is preferred. The reaction time is variable, fundamentally more or less dependent on the reaction temperature, while it can be normally around 10 minutes-24 hours.

The reaction ratio of the acid anhydride/polyol can be normally within a range of 0.8/1-1.2/1, preferably 0.85/1-1.1.5/1, in terms of the equivalent ratio calculating the acid anhydride as the functional group, whereby the intended half-ester can be obtained at the maximum.

The acid anhydride to be used for preparation of the desired half-ester has a carbon number within a range of 2-30, excluding the carbon atoms in the acid moiety. Examples of such acid anhydride include aliphatic acid anhydride, cycloaliphatic acid anhydride, olefin acid anhydride, cycloolefinic acid anhydride and aromatic acid anhydride. These acid anhydrides may have substituents, so long as they are not detrimental to the reactivity of the acid anhydrides or to the characteristics of the resultant half-esters. Examples of such substituent include chloro, alkyl, alkoxy and the like. Examples of the acid anhydride include succinic anhydride, methylsuccinic anhydride, dodecenylsuccinic anhydride, octadecenylsuccinic anhydride, phthalic anhydride, tetrahydrophthalic anhydride, methyltetrahydrophthalic anhydride, hexahydrophthalic anhydride, alkylhexahydrophthalic anhydride (e.g., methylhexahydrophthalic anhydride), tetrafluorophthalic anhydride, endomethylenetetrahydrophthalic anhydride, chlorendic anhydride, itaconic anhydride, citraconic anhydride, maleic anhydride and the like.

As the polyols useful for the half-esterification of such acid anhydrides, for example, $C_{2-20}$ polyols, in particular, $C_{2-10}$ polyols, preferably diols, triols and their mixtures can be named, specific examples including aliphatic polyols such as ethylene glycol, 1,2-propanediol, 1,3-propanediol, 1,4-butanediol, 1,5-pentanediol, glycerol, 1,2,3-butanetriol, 1,6-hexanediol, neopentyl glycol, diethylene glycol, dipropylene glycol, 1,4-cyclohexanedimethanol, 3-methyl-1,5-pentanediol, trimethylolpropane, 2,2,4-trimethylpentane-1,3-diol, pentaerythritol, 1,2,3,4-butanetetraol and the like. Aromatic polyols such as bisphenol A, bis(hydroxymethyl)xylene and the like can also be used.

Polyepoxide to be used in combination with so far described carboxy-containing compounds is a compound containing epoxy groups in their molecules. Those of which epoxy group content is within a range of normally 0.8-15 mmol/g, in particular, 1.2-10 mmol/g are preferred.

Examples of the polyepoxide include epoxy-containing acrylic polymers; glycidyl ether compounds such as diglycidyl ether, 2-glycidyl phenylglycidyl ether, 2,6-diglycidyl phenylglycidyl ether, and the like; compounds containing glycidyl group and alicyclic epoxy group, such as vinylcyclohexene dioxide, limonene dioxide and the like; and alicyclic epoxy-containing compounds such as dicyclopentadiene dioxide, bis(2,3-epoxycyclopentyl)ether, epoxycyclohexenecarboxylic acid ethylene glycol diester, bis(3,4-epoxycyclohexylmethyl)adipate, 3,4-epoxycyclohexylmethyl-3,4-epoxycyclohexanecarboxylate, 3,4-epoxy-6-methylcyclohexyl-methyl-3,4-epoxy-6-methylcyclohexanecarboxylate and the like. These can be used either alone or in combination of two or more. In particular, use of epoxy-containing acrylic polymer is preferred.

The epoxy-containing acrylic polymer can be readily obtained by copolymerization of epoxy-containing unsaturated monomer with other polymerizable unsaturated monomer by a similar method to one useful for preparation of the polymer (1).

Examples of the epoxy-containing unsaturated monomer include glycidyl(meth)acrylate; allyl glycidyl ether; and alicyclic epoxy-containing unsaturated monomer such as 3,4-epoxycyclohexylmethyl(meth)acrylate.

As the other polymerizable unsaturated monomer, for example, those named in association with the polymer (1), i.e., hydroxy-containing unsaturated monomers, (meth)acrylic acid esters, vinyl ethers or aryl ethers, olefin compounds and diene compounds, hydrocarbon ring-containing unsaturated monomers, nitrogen-containing unsaturated monomers, hydrolyzable alkoxysilyl-containing acrylic monomers and the like can be named.

The polyepoxide preferably has a weight-average molecular weight within a range of generally 1,000-20,000, in particular, 1,500-15,000, inter alia, 2,000-5,000.

The blend ratio of the carboxy-containing compound and polyepoxide in the clear paint (Z) preferably is so selected that the equivalent ratio of the carboxy groups in the carboxy-containing compound to the epoxy groups in the polyepoxide falls within a range of generally 1/0.5-0.5/1, in particular, 1/0.7-0.7/1, inter alia, 1/0.8-0.8/1, from the viewpoint of curability of the coating film.

A curing catalyst may be blended in the clear paint (Z), where necessary. Useful curing catalyst is one effective for the ring-opening esterification reaction between carboxy groups in the carboxy-containing compound and epoxy groups in the polyepoxide, examples of which include quaternary salt catalysts such as tetraethylammonium bromide, tetrabutylammonium bromide, tetraethylammonium chloride, tetrabutylphosphonium bromide, triphenylbenzylphosphonium chloride and the like; and amine compounds such as triethylamine, tributylamine and the like. Of these, quaternary salt catalysts are preferred. Furthermore, a quaternary salt which is blended with an approximately equivalent thereto of an acidic phosphoric acid compound such as butylphosphoric acid is advantageous, in that the blend can improve storage stability of the paint and prevent deterioration in spray coating ability of the paint due to drop in its electric resistance, without impairing the above catalytic action.

Where a curing catalyst is blended, its normally preferred blend ratio is about 0.01-5 mass parts, per 100 mass parts of the combined solid content of the carboxy-containing compound and polyepoxide.

The clear paint (Z) can also contain, where necessary, coloring pigment, effect pigment, dye and the like to an extent not impairing the transparency, and furthermore, suitably extender, thickener, UV absorber, light stabilizer, defoamer, plasticizer, organic solvent, surface regulating agent, antisettling agent and the like.

The clear paint (Z) is a paint composition having the maximum storage modulus (G'1) as measured while being kept at 110° C. for 10 minutes, at a stress of 0.6 Pa and frequency of 0.1 Hz, falling within a range of 0.001-30 Pa, preferably 0.005-20 Pa, inter alia, 0.01-10 Pa.

In the present invention, the maximum storage modulus (G'1) is a value determined by measuring the storage modulus (G') of the clear paint (Z), which was heated to a temperature up to 110° C. at a temperature rise rate of 10° C./min and kept at said temperature for 10 minutes, at a stress of 0.6 Pa and frequency of 0.1 Hz. Specifically, for example, using an elasto-viscosimeter equipped with a heater under the heating conditions of heating the object clear paint (Z) up to 110° C. at a temperature rise rate of 10° C./min, and thereafter maintaining it at said temperature for 10 minutes, the storage modulus (G') of the clear paint (Z) at a stress of 0.6 Pa and frequency of 0.1 Hz is continuously measured, and the maximum value of the storage modulus (G') during the 10 minutes' maintenance at 110° C. is recorded as the maximum storage modulus (G'1). As the elasto-viscosimeter, RheoStress RS150 (tradename, HAAKE Co.) can be used.

Regulation of the maximum storage modulus (G'1) can be done by adjustment of molecular weight of the resin component or polarity of the resin component in the paint, addition of thickener or organic solvent, adjustment of pigment concentration and the like. Of these, the means of adjusting the molecular weight of the resin component, in particular, that of the molecular weight of the carboxy-containing resin is especially suitable, from the viewpoint of enabling effective regulation of the maximum storage modulus (G'1).

The clear paint (Z) can be applied onto the coating film surface of the water-based base paint (Y) by a method known per se, for example, airless spray, air spray, rotary atomizer or the like. Static electricity may be impressed in the occasion of coating. The coating film thickness in terms of cured film thickness can be normally within a range of 10-60 μm, preferably 25-50 μm.

Step (6):

The multilayer coating film formed of the three layers of intermediate coat, base coat and clear coat as in the above-described steps (1)-(5) is bake-cured simultaneously, by heating at 100-120° C. for 3-10 minutes and thereafter at 130-160° C. for further 10-30 minutes.

The heating can be carried out by conventional baking means of coating film, for example, hot air heating, infrared heating, high frequency heating or the like. Specifically, for example, a method comprising placing a coating object, onto which a water-based intermediate paint (X), water-based base paint (Y) and clear paint (Z) have been successively applied, in a drying oven of which temperature is adjusted to 100-120° C., keeping the object therein for 3-10 minutes, thereafter raising the temperature of the drying oven to 130-160° C. and maintaining the object therein for 10-30 minutes; a method using a tunnel-type dryer having an entrance and an exit at its two ends and drying an object passing therethrough as mounted on a belt conveyer, inside of which is divided into a low temperature zone and a high temperature zone, respectively set at 100-120° C. and 130-160° C., passing the object through the low temperature zone over 3-10 minutes, and thereafter passing it through the high temperature zone over 10-30 minutes; a method using a first drying oven of which temperature is adjusted to 100-120° C. and a second drying oven of which temperature is adjusted to 130-160° C., maintaining a coating object, onto which a water-based intermediate paint (X), water-based base paint (Y) and clear paint (Z) have been successively applied, in the first drying oven for 3-10 minutes, and thereafter maintaining it in the second drying oven for 10-30 minutes; and the like can be used.

As the reason why the application of the coating film-producing method of the present invention in the occasion of applying a water-based intermediate paint and water-based base paint by 3-coat-1-bake system enables formation of multilayer film excelling in smoothness and distinctness of image, we infer as follows. Because the clear paint containing the carboxy-containing compound and polyepoxide is applied onto the base coat, under the conditions that the intermediate coat and base coat whose respective solid paint contents are relatively high and the volatile component remaining in the base coat contains a large amount of alcohol solvent having a relatively high boiling point, the clear paint is uniformly wet-spread on the base coat; and because the heating is given in two stages, the solvents in the paints such as the alcohol solvent are mildly volatilized, to form a multilayer film excelling in smoothness and distinctness of image. Furthermore, because the clear paint is a paint composition having the maximum storage modulus (G'1) within a range of 0.001-30 Pa, as measured with the paint which is maintained at 110° C. for 10 minutes, at a stress of 0.6 Pa and frequency of 0.1 Hz, the clear paint uniformly wet-spread on the base coat during the first stage heating at 100-120° C. for 3-10 minutes, to improve smoothness of the resulting coating film.

EXAMPLE

Hereinafter the invention is explained more specifically, referring to working Examples and Comparative Examples, it being understood that the invention is not limited to these Examples only. "Part" and "%" are invariably by mass.

Preparation of Hydroxy-Containing Acrylic Resin (A1)

Production Example 1

A reactor equipped with a thermometer, thermostat, stirrer, reflux condenser and dropping device was charged with 70.7 parts of deionized water and 0.52 part of AQUALON KH-10 (tradename, Daiichi Kogyo Seiyaku, Ltd. an emulsifier, active component 97%), which were stirred and mixed in nitrogen gas current, and the temperature in the reactor was raised to 80° C. Then 1% of the total amount of the later specified monomer emulsion and 5 parts of 6% aqueous ammonium persulfate solution were introduced into the reactor, and kept at 80° C. for 15 minutes. Thereafter the remainder of the monomer emulsion was dropped into the reactor which was maintained at the same temperature, consuming 3 hours, followed by an hour's aging. Thereafter the reaction mixture was cooled down to 30° C. under gradual addition of 40 parts of 5% aqueous 2-(dimethylamino)ethanol solution into the reactor, of which content was then discharged, while being filtered through 100-meth nylon cloth. Thus a hydroxy-containing acrylic resin emulsion (A1-1) having a solid content of 45% was obtained. The resulting hydroxy-containing acrylic resin had an acid value of 12 mgKOH/g and a hydroxyl value of 43 mgKOH/g.

Monomer emulsion: The monomer emulsion was obtained by mixing by stirring 50 parts of deionized water, 10 parts of styrene, 40 parts of methyl methacrylate, 35 parts of ethyl acrylate, 3.5 parts of n-butyl methacrylate, 10 parts of 2-hydroxyethyl methacrylate, 1.5 parts of acrylic acid, 1.0 part of AQUALON KH-10 and 0.03 part of ammonium persulfate.

Production Example 2

A reactor equipped with a thermometer, thermostat, stirrer, reflux condenser and dropping device was charged with 130 parts of deionized water and 0.52 part of AQUALON KH-10, which were stirred and mixed in nitrogen gas current, and the temperature was raised to 80° C. Then 1% of the total amount of the following monomer emulsion (1) and 5.3 parts of 6% aqueous ammonium persulfate solution were introduced into the reactor and kept at 80° C. for 15 minutes. Thereafter the remainder of the monomer emulsion (1) was dropped into the reactor which was maintained at the same temperature, over 3 hours, followed by 1 hour's aging. Then the following monomer emulsion (2) was added dropwise over an hour, and after the subsequent 1 hour's aging, the reaction mixture was cooled to 30° C. under gradual addition of 40 parts of 5% aqueous dimethylethanolamine solution into the reactor, and discharged while being filtered through 100-mesh nylon cloth. Whereupon a hydroxy-containing acrylic resin emulsion (A1-2) having an average particle size of 100 nm [measured with a submicron particle size distribution-measuring device, COULTER N4 Model (tradename, Beckman Coulter, Inc.) as diluted with deionized water, at 20° C.] and a solid content of 30% was obtained. Thus obtained hydroxy-containing acrylic resin had an acid value of 33 mgKOH/g and a hydroxyl value of 25 mgKOH/g.

Monomer emulsion (1): Monomer emulsion (1) was obtained by mixing by stirring 42 parts of deionized water, 0.72 part of AQUALON KH-10, 2.1 parts of methylenebisacrylamide, 2.8 parts of styrene, 16.1 parts of methyl methacrylate, 28 parts of ethyl acrylate and 21 parts of n-butyl acrylate.

Monomer emulsion (2): Monomer emulsion (2) was obtained by mixing by stirring 18 parts of deionized water, 0.31 part of AQUALON KH-10, 0.03 part of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate and 9 parts of n-butyl acrylate.

Preparation of Hydroxy-Containing Polyester Resin (A2)

Production Example 3

A reactor equipped with a thermometer, thermostat, stirrer, reflux condenser and water-separator was charged with 174 parts of trimethylolpropane, 327 parts of neopentyl glycol, 352 parts of adipic acid, 109 parts of isophthalic acid and 101 parts of 1,2-cyclohexanedicarboxylic anhydride, and the temperature therein was raised from 160° C. to 230° C. over 3 hours. While maintaining the temperature at 230° C. and distilling off the formed water of condensation with the water separator, the reaction was carried out until the acid value became no higher than 3 mgKOH/g. To the reaction product 59 parts of trimellitic anhydride was added, followed by 30 minutes' addition reaction at 170° C. Cooling the reaction product to 50° C. or lower, an equivalent to the acid groups therein of 2-(dimethylamino)ethanol was added for neutralization. Then deionized water was gradually added to provide a hydroxy-containing polyester resin solution (A2-1) having a solid content of 45% and pH 7.2. Thus obtained hydroxy-containing polyester resin had an acid value of 35 mgKOH/g, hydroxyl value of 128 mgKOH/g and weight-average molecular weight of 13,000.

Production Example 4

A reactor equipped with a thermometer, thermostat, stirrer, reflux condenser and water-separator was charged with 109 parts of trimethylolpropane, 141 parts of 1,6-hexanediol, 126 parts of hexahydrophthalic anhydride and 120 parts of adipic acid, and the temperature therein was raised from 160° C. to 230° C. over 3 hours. Thereafter the condensation reaction was carried out at 230° C. for 4 hours. In order to add carboxy groups to the condensation reaction product, further 38.3 parts of trimellitic anhydride was added, reacted at 170° C. for 30 minutes, and the product was diluted with 1-octanol (an alcohol solvent boiling at 195° C.), to provide a hydroxy-containing polyester resin solution (A2-2) having a solid content of 70%. Thus obtained hydroxy-containing polyester resin had an acid value of 46 mgKOH/g, hydroxyl value of 150 mgKOH/g and a weight-average molecular weight of 6,400.

Preparation of Water-Based Intermediate Paint (X)

Production Example 5

A pigment-dispersed paste was obtained by mixing 56 parts (solid resin content, 25 parts) of the hydroxy-containing polyester resin solution (A2-1) as obtained in Production Example 3, 60 parts of JR-806 (tradename, Tayca Corporation, rutile type titanium dioxide), 1 part of CARBON MA-100 (tradename, Mitsubishi Chemicals Co., carbon black), 15 parts of BARIACE B-35 (tradename, Sakai Chemical Industry Co., Ltd., barium sulfate powder, average primary particle size, 0.5 µm), 3 parts of MICRO ACE S-3 (tradename, Nippon Talc Co., Ltd., talc powder, average primary particle size, 4.8 µm) and 5 parts of deionized water; adjusting pH of the mixture to 8.0 with 2-(dimethylamino) ethanol and dispersing it with a paint shaker for 30 minutes.

Then 140 parts of so obtained pigment-dispersed paste, 33 parts of the hydroxy-containing acrylic resin emulsion (A1-1) as obtained in Production Example 1, 33 parts of the hydroxy-containing polyester resin solution (A2-1) as obtained in Production Example 3, 37.5 parts of CYMEL 325 (tradename, Nihon Cytec Industries, Inc., melamine resin, solid content 80%), 26 parts of BAYHYDUR VPLS 2310 (tradename, Sumika Bayer Urethane Co., Ltd., blocked polyisocyanate compound, solid content 38%) and 43 parts of U-COAT UX-8100 (tradename, Sanyo Chemical Industries, Ltd., a urethane emulsion, solid content 35%) were uniformly mixed.

Thereafter UH-752 (tradename, ADEKA Corporation, a thickener), 2-(dimethylamino)ethanol and deionized water were added to the formed mixture to provide a water-based intermediate paint (X-1) whose pH was 8.0, solid content, 48%, and viscosity, 30 seconds as measured with Ford cup No. 4 at 20° C.

Preparation of Effect Pigment Concentrate

Production Example 6

Within an agitation mixing vessel, 19 parts of aluminum pigment paste, GX-180A (tradename, Asahikasei Metals Co., Ltd., metal content 74%), 35 parts of 1-octanol (an alcohol solvent boiling at 195° C.), 8 parts of phosphoric acid group-containing resin solution (note 1) and 0.2 part of 2-(dimethylamino)ethanol were uniformly mixed to provide an effect pigment concentrate (P-1).

(note 1) Phosphoric acid group-containing resin solution: A reactor equipped with a thermometer, thermostat, stirrer, reflux condenser and dropping device was charged with a mixed solvent of 27.5 parts of methoxypropanol and 27.5 parts of isobutanol. After heating it to 110° C., 121.5 parts of a mixture consisting of 25 parts of styrene, 27.5 parts of n-butyl methacrylate, 20 parts of Isostearyl Acrylate (tradename, Osaka Organic Chemical Industry, Ltd., a branched higher alkyl acrylate), 7.5 parts of 4-hydroxybutyl acrylate, 15 parts of phosphoric acid group-containing polymerizable monomer (note 2), 12.5 parts of 2-methacryloyloxyethyl acid phosphate, 10 parts of isobutanol and 4 parts of t-butyl peroxyoctanoate was added to the mixed solvent over 4 hours, and thereafter further a mixture of 0.5 part of t-butyl peroxyoctanoate and 20 parts of isopropanol was added dropwise over an hour. Stirring and aging the reaction mixture for a subsequent hour, a phosphoric acid group-containing resin solution having a solid content of 50% was obtained. The acid value of this resin attributable to the phosphoric acid groups was 83 mgKOH/g, hydroxyl value was 29 mgKOH/g and weight-average molecular weight was 10,000.

(note 2) Phosphoric acid group-containing polymerizable monomer: A reactor equipped with a thermometer, thermostat, stirrer, reflux condenser and dropping device was charged with 57.5 parts of monobutylphosphoric acid and 41 parts of isobutanol. Raising the temperature to 90° C., 42.5 parts of glycidyl methacrylate was added dropwise over 2 hours, followed by an hour's aging under stirring. Then 59 parts of isopropanol was added to provide a phosphoric acid group-containing polymerizable monomer solution having a solid content of 50%. Thus obtained monomer had an acid value attributable to the phosphoric acid groups of 285 mgKOH/g.

Production Example 7

Production Example 6 was repeated except that 35 parts of the 1-octanol was replaced with 35 parts of 2-ethyl-1-hexanol (an alcohol solvent boiling at 184° C.), to provide an effect pigment concentrate (P-2).

Production Example 8

Production Example 6 was repeated except that 35 parts of the 1-octanol was replaced with a mixed solvent consisting of 25 parts of 2-ethyl-1-hexanol (an alcohol solvent boiling at 184° C.) and 10 parts of 1-hexanol (an alcohol solvent boiling at 157° C.), to provide an effect pigment concentrate (P-3).

Production Example 9

Production Example 6 was repeated except that 35 parts of the 1-octanol was replaced with 35 parts of 1-hexanol (an alcohol solvent boiling at 157° C.), to provide an effect pigment concentrate (P-4).

Production Example 10

Production Example 6 was repeated except that 35 parts of the 1-octanol was replaced with 35 parts of ethyl-3-ethoxypropionate (an ester solvent boiling at 170° C.), to provide an effect pigment concentrate (P-5).

Preparation of Water-Based Base Paint (Y)

Production Example 11

A water-based base paint (Y-1) was obtained by uniformly mixing 100 parts of the hydroxy-containing acrylic resin emulsion (A1-2) as obtained in Production Example 2, 57 parts of the hydroxy-containing polyester resin solution (A2-2) as obtained in Production Example 4, 62 parts of the effect pigment concentrate (P-1) as obtained in Production Example 6 and 37.5 parts of CYMEL 325 (tradename, Nihon Cytec Industries, Inc., a melamine resin, solid content 80%), and further adding thereto PRIMAL ASE-60 (tradename, Rohm & Haas Co., a thickener), 2-(dimethylamino)ethanol and deionized water. Thus obtained water-based base paint (Y-1) had a pH of 8.0, solid content of 25% and viscosity of 40 seconds as measured with Ford cup No. 4 at 20° C.

Production Examples 12-15

Production Example 11 was repeated except that the effect pigment concentrate (p-1) was replaced with each of the effect pigment concentrate as indicated in Table 1 given later, and water-based base paints (Y-2)-(Y-5) each having a pH of 8.0, solid content of 25% and viscosity of 40 seconds as measured with Ford cup No. 4 at 20° C. were obtained.

Preparation of Carboxy-Containing Compound

Production Example 16

A reactor equipped with a thermometer, thermostat, stirrer, reflux condenser, nitrogen inlet pipe and dropping device was charged with 680 parts of SWAZOL 1000 (tradename, Cosmo Oil Co., Ltd., a hydrocarbon organic solvent), which was then heated to 125° C. while passing nitrogen gas therethrough. When 125° C. was reached, nitrogen gas supply was stopped, and a monomer mixture as specified in the following was added dropwise at a constant rate over 4 hours. In the mixture, tert-butylperoxy-2-ethylhexanoate is a polymerization initiator.

Monomer mixture: The monomer mixture was formed by mixing by stirring 500 parts of styrene, 500 parts of cyclohexyl methacrylate, 500 parts of isobutyl methacrylate, 500 parts of maleic anhydride, 1000 parts of ethyl 3-ethoxypropionate and 300 parts of tert-butylperoxy-2-ethylhexanoate.

The reaction mixture was aged for 30 minutes while passing nitrogen gas therethrough, and thereafter further a mixture of 10 parts of tert-butylperoxy-2-ethylhexanoate and 80 parts of SWAZOL 1000 was added dropwise over an hour, followed by cooling to 60° C. and addition of 490 parts of methanol and 4 parts of triethylamine. The subsequent half-esterification reaction was continued for 4 hours, by heating under reflux. Then the excessive 326 parts of methanol was removed under reduced pressure, to provide a carboxy-containing compound solution (R-1) having a solid content of 55%. The carboxy-containing compound had a weight-average molecular weight of 2,500 and an acid value of 130 mgKOH/g.

Production Example 17

Production Example 16 was repeated except that the 300 parts of tert-butylperoxy-2-ethylhexanoate was changed to 360 parts, to provide a carboxy-containing compound solution (R-2). The carboxy-containing compound had a weight-average molecular weight of 2,100 and an acid value of 130 mgKOH/g.

Production Example 18

Production Example 16 was repeated except that the 300 parts of tert-butylperoxy-2-ethylhexanoate was changed to 260 parts, to provide a carboxy-containing compound solution (R-3). The carboxy-containing compound had a weight-average molecular weight of 2,900 and an acid value of 130 mgKOH/g.

Production Example 19

Production Example 16 was repeated except that the 300 parts of tert-butylperoxy-2-ethylhexanoate was changed to 400 parts, to provide a carboxy-containing compound solution (R-4). The carboxy-containing compound had a weight-average molecular weight of 1,500 and an acid value of 130 mgKOH/g.

Production Example 20

Production Example 16 was repeated except that the 300 parts of tert-butylperoxy-2-ethylhexanoate was changed to 200 parts, to provide a carboxy-containing compound solution (R-5). The carboxy-containing compound had a weight-average molecular weight of 3,500 and an acid value of 130 mgKOH/g.

Preparation of Polyepoxide

Production Example 21

A reactor equipped with a thermometer, thermostat, stirrer, reflux condenser, nitrogen inlet pipe and dropping device was charged with 410 parts of xylene and 77 parts of n-butanol, which was heated to 125° C. while passing nitrogen gas therethrough. When 125° C. was reached, nitrogen gas supply was stopped, and a monomer mixture as specified in the following was added dropwise at a constant rate over 4 hours. In the mixture, azobisisobutyronitrile is a polymerization initiator.

Monomer mixture: the monomer mixture was formed by mixing by stirring 432 parts of glycidyl methacrylate (30%), 720 parts of n-butyl acrylate (50%), 288 parts of styrene (20%) and 144 parts of azobisisobutyronitrile.

The reaction mixture was aged for 30 minutes while passing nitrogen gas therethrough, and thereafter further a mixture of 90 parts of xylene, 40 parts of n-butanol and 14.4 parts of azobisisobutyronitrile was added dropwise over 2 hours, followed by 2 hours' aging. Thus a polyepoxide solution having a solid content of 70% was obtained. The resultant polyepoxide had a weight-average molecular weight of 2,500 and an epoxy content of 2.12 mmol/g.

Preparation of Clear Paint (Z)

Production Example 22

Uniformly mixing 91 parts (solid content 50 parts) of the carboxy-containing compound solution (R-1) as obtained in Production Example 16, 71 parts (solid content 50 parts) of the polyepoxide solution as obtained in Production Example 21, 1 part of TBAB (tradename, Lion Akzo K.K., tetrabutylammonium bromide, active component 100%) and 0.2 part of BYK-300 (tradename, BYK Chemie GmbH, a surface-regulating agent, active component 52%), and further adding to the mixture SWAZOL 1000 (tradename, Cosmo Oil Co., Ltd., a hydrocarbon solvent), a clear paint (Z-1) having a viscosity of 25 seconds as measured with Ford cup No. 4 at 20° C. was obtained.

Storage modulus (G') of the clear paint (Z-1) at a stress of 0.6 Pa and frequency of 0.1 Hz was continuously measured under the heating conditions of heating the sample up to 110° C. at a temperature rise rate of 10° C./min and maintaining it at said temperature for 10 minutes, with RheoStress RS150 (article name, HAAKE Co.). Then the maximum storage stability (G'1) of the clear paint (Z-1) was determined on the measured data plotting the storage modulus (G') versus the temperature of the clear paint (Z-1). The maximum storage modulus (G'1) of the clear paint (Z-1) was 0.02 Pa.

Examples 23-26

Production Example 22 was repeated except that the carboxy-containing compound solution (R-1) was replaced with each of the carboxy-containing compound solutions (R-2)-(R-5) as indicated in the following Table 1, and clear paints (Z-2)-(Z-5) having a viscosity of 25 seconds as measured with Ford cup No. 4 at 20° C. were obtained. The maximum storage modulus (G'1) values of the resulting clear paints (Z-2)-(Z-5) are also shown in the Table 1.

Coating Film-Forming Method

Test plates were prepared using the water-based intermediate paint (X-1) as obtained in Production Example 5, water-based base paints (Y-1)-(Y-5) as obtained in Production Examples 11-15, clear paints (Z-1)-(Z-5) as obtained in Production Examples 22-26, and MAGICRON TC-71 (tradename, Kansai Paint Co., Ltd. a thermosetting clear paint comprising hydroxy-containing acrylic resin and melamine resin, which may be hereafter referred to as "clear paint (Z-6)", by the following procedure, and their evaluation tests were conducted.

(Preparation of Test Coating Object)

Onto cold-rolled steel sheets which had been given a zinc phosphate chemical conversion treatment, ELECRON GT-10 (tradename, Kansai Paint Co., Ltd., a cationic electrodeposition paint) was electrocoated to a dry film thickness of 20 μm, and heated at 170° C. for 30 minutes to be cured, to provide a test coating object.

Example 1

Onto the above test coating object, the water-based intermediate paint (X-1) as obtained in Production Example 5 was electrostatically coated with a rotary atomizing type electrostatic coater, to a cured film thickness of 25 μm. The coated object was left to stand for 2 minutes, and preheated at 80° C. for 3 minutes. The solid paint content of the intermediate coat after the preheating was 90 mass %. Then the water-based base paint (Y-1) as obtained in Production Example 11 was electrostatically coated on the uncured intermediate coat with a rotary atomizing type electrostatic coater, to a cured film thickness of 15 μm, followed by 2 minutes' standing and 3 minutes' preheating at 80° C. The solid paint content of the base coat after the preheating was 85 mass %.

Furthermore, onto the base coat the clear paint (Z-1) as obtained in Production Example 22 was electrostatically coated to a dry film thickness of 35 μm, and left to stand for 7 minutes. Then the test coated object was kept in the first drying oven maintained at 105° C. for 7 minutes, and thereafter in the second drying oven maintained at 140° C. for 20 minutes, and whereby the intermediate coat, base coat and clear coat were baked and cured simultaneously, to provide a test plate.

Examples 2-5, Comparative Examples 1-8

Test plates were prepared in the manner similar to Example 1, except that the preheating condition of the water-based intermediate coat was changed as indicated in the later given Table 1, the water-based base paint (Y-1) in some of the Examples was replaced with one of the water-based base paints (Y-2)-(Y-5) as indicated in the Table 1, the preheating condition of the water-based base coat was made as shown in Table 1, the clear paint (Z-1) in some of the Examples was changed to one of clear paints (Z-2)-(Z-6) as in the Table 1, and the bake-curing conditions of the coating film as in the Table 1 were employed.

Evaluation Tests

The test plates as obtained in above Examples 1-5 and Comparative Examples 1-8 were evaluated by the following test methods. The results of the evaluation were as shown in the following Table 1.

(Test Methods)

Smoothness: Evaluated using Wc value measured with Wave Scan DOI (tradename, BYK Gardner Co.). Wc value is an index of the amplitude of surface roughness of wavelength ranging about 1-3 mm, and the less the Wc value, the higher the smoothness of the coated surface.

Distinctness of image: Evaluated using Wa value measured with Wave Scan DOI. Wa value is an index of the amplitude of surface roughness of wavelengths ranging about 0.1-0.3 mm, and the less the Wa value, the higher the distinctness of image of the coated surface.

TABLE 1

| | | | Example | | | | | Comparative Example | |
|---|---|---|---|---|---|---|---|---|---|
| | | | 1 | 2 | 3 | 4 | 5 | 1 | 2 |
| Step 1 | Water-based intermediate paint (X) | | X-1 | X-1 | X-1 | X-1 | X-1 | X-1 | X-1 |
| Step 2 | Preheating condition | Temp. (° C.) | 80 | 80 | 80 | 80 | 80 | 80 | 80 |
| | | time (min) | 3 | 3 | 3 | 3 | 3 | 3 | 3 |
| | Solid content of intermediate coat after preheating (%) | | 90 | 90 | 90 | 90 | 90 | 90 | 90 |
| Step 3 | Water-based base paint (Y) | Paint name | Y-1 | Y-2 | Y-3 | Y-1 | Y-1 | Y-4 | Y-5 |
| | | Effect pigment concentrate | P-1 | P-2 | P-3 | P-1 | P-1 | P-4 | P-5 |
| | | Solvent content per 100 mass parts of solid resin content (part) | 1-octanol (b.p. 195° C.) | 52 | 17 | 17 | 17 | 17 | 17 | 17 |
| | | | 2-ethyl-1-hexanol (b.p. 184° C.) | | 35 | 25 | 35 | 35 | | |
| | | | 1-hexanol (b.p. 157° C.) | | | 10 | | | 35 | |
| | | | Ethyl-3-ethoxy-propionate (b.p. 170° C.) | | | | | | | 35 |
| Step 4 | Preheating condition | Temp. (° C.) | 80 | 80 | 80 | 80 | 80 | 80 | 80 |
| | | time (min) | 3 | 3 | 3 | 3 | 3 | 3 | 3 |
| | Solid content of base coat after preheating (%) | | 85 | 87 | 88 | 85 | 85 | 95 | 87 |
| Step 5 | Clear paint (Z) | Paint name | Z-1 | Z-1 | Z-1 | Z-2 | Z-3 | Z-1 | Z-1 |
| | | Carboxy-containing compound solution | R-1 | R-1 | R-1 | R-2 | R-3 | R-1 | R-1 |
| | | Maximum storage modulus (G'1) | 0.02 | 0.02 | 0.02 | 3 × 10⁻³ | 25 | 0.02 | 0.02 |
| Step 6 | Heating conditions | First stage temp. (° C.) | 105 | 110 | 115 | 110 | 110 | 105 | 105 |
| | | time (min) | 7 | 6 | 5 | 6 | 6 | 7 | 7 |
| | | Second stage temp. (° C.) | 140 | 140 | 140 | 140 | 140 | 140 | 140 |
| | | time (min) | 20 | 25 | 25 | 25 | 25 | 20 | 20 |
| Evaluation Result | Smoothness | | 7.9 | 8.7 | 9.2 | 6.5 | 9.8 | 16.9 | 17.8 |
| | Distinctness of image | | 8.6 | 8.9 | 9.8 | 10.6 | 9.0 | 16.6 | 17.6 |

| | | | Comparative Example | | | | | |
|---|---|---|---|---|---|---|---|---|
| | | | 3 | 4 | 5 | 6 | 7 | 8 |
| Step 1 | Water-based intermediate paint (X) | | X-1 | X-1 | X-1 | X-1 | X-1 | X-1 |
| Step 2 | Preheating condition | Temp. (° C.) | 40 | 80 | 80 | 80 | 80 | 80 |
| | | time (min) | 2 | 3 | 3 | 3 | 3 | 3 |
| | Solid content of intermediate coat after preheating (%) | | 65 | 90 | 90 | 90 | 90 | 90 |

Maximum storage modulus (G'1) in Step 5 row: for Example 4 it is $3 \times 10^{-3}$.

TABLE 1-continued

| Step 3 | Water-based base paint (Y) | Paint name | | Y-1 | Y-1 | Y-1 | Y-1 | Y-1 | Y-1 |
|---|---|---|---|---|---|---|---|---|---|
| | | Effect pigment concentrate | | P-1 | P-1 | P-1 | P-1 | P-1 | P-1 |
| | | Solvent content per 100 mass parts of solid resin content (part) | 1-octanol (b.p. 195° C.) | 52 | 52 | 52 | 17 | 17 | 52 |
| | | | 2-ethyl-1-hexanol (b.p. 184° C.) | | | | 35 | 35 | |
| | | | 1-hexanol (b.p. 157° C.) | | | | | | |
| | | | Ethyl-3-ethoxy-propionate (b.p. 170° C.) | | | | | | |
| Step 4 | Preheating condition | Temp. (° C.) | | 40 | 80 | 80 | 80 | 80 | 80 |
| | | time (min) | | 3 | 3 | 3 | 3 | 3 | 3 |
| | Solid content of base coat after preheating (%) | | | 65 | 85 | 85 | 85 | 85 | 85 |
| Step 5 | Clear paint (Z) | Paint name | | Z-1 | Z-1 | Z-1 | Z-4 | Z-5 | Z-6 |
| | | Carboxy-containing compound solution | | R-1 | R-1 | R-1 | R-4 | R-5 | |
| | | Maximum storage modulus (G'1) | | 0.02 | 0.02 | 0.02 | $5 \times 10^{-4}$ | 48 | 210 |
| Step 6 | Heating conditions | First stage | temp. (° C.) | 105 | 80 | 140 | 110 | 110 | 110 |
| | | | time (min) | 7 | 6 | 30 | 6 | 6 | 6 |
| | | Second stage | temp. (° C.) | 140 | 140 | | 140 | 140 | 140 |
| | | | time (min) | 20 | 20 | | 25 | 25 | 20 |
| Evaluation Result | Smoothness | | | 20.1 | 15.4 | 19.6 | 6.1 | 16.0 | 25.5 |
| | Distinctness of image | | | 18.1 | 14.4 | 17.5 | 16.0 | 14.5 | 23.3 |

The invention claimed is:

1. A method for forming a multilayer coating film on a coating object, which comprises successively carrying out the following steps (1)-(6):

(1) a step of applying a water-based intermediate paint (X), which comprises, as a thermosetting resin component, a base resin (A) which is a combination of both a hydroxy-containing acrylic resin (A1) and a hydroxy-containing polyester resin (A2), and a crosslinking agent (B) which is a combination of both an amino resin (B1) and a blocked polyisocyanate compound (B2), to form an intermediate coating film, (2) a step of adjusting a solid content of the intermediate coating film which is formed in the step (1) to 70-100 mass %, (3) a step of forming a base coating film by applying onto the intermediate coating film as obtained in the step (2) a water-based base paint (Y), which comprises, as a thermosetting resin component, a base resin (A) which is a combination of both a hydroxy-containing acrylic resin (A1) and a hydroxy-containing polyester resin (A2), and a crosslinking agent (B) of an amino resin (B1), and which comprises 30-55 mass parts, per 100 mass parts of a solid resin content of the paint (Y), of an alcohol solvent having a boiling point of 170-250° C., (4) a step of adjusting a solid content of the base coating film which is formed in the step (3) to 70-100 mass % and pre-heating the intermediate coating film and the base coating film at 30-100° C. for 30 seconds-15 minutes, (5) a step of forming a clear coating film by applying onto the base coating film as obtained in the step (4) a clear paint (Z) comprising 30-70 mass parts of a carboxy-containing compound and 70-30 mass parts of a polyepoxide, per 100 mass parts of a solid resin content of the paint (Z), wherein the maximum storage modulus (G'1) of the paint (Z), as measured while being kept at 110° C. for 10 minutes at a stress of 0.6 Pa and frequency of 0.1 Hz, falls within a range of 0.001-30 Pa, and (6) a step of curing the intermediate coating film, base coating film and clear coating film, which are formed in the steps (1)-(5), simultaneously, by heating them at 100-120° C. for 3-10 minutes and thereafter further heating them at 130-160° C. for 10-30 minutes.

2. The multilayer coating film-forming method according to claim 1, in which the solid content of the intermediate coating film is adjusted to 75-100 mass % in the step (2).

3. The multilayer coating film-forming method according to claim 1, in which the intermediate coating film is preheated at 30-100° C. for 30 seconds-15 minutes in the step (2).

4. The multilayer coating film-forming method according to claim 1, in which the water-based base paint (Y) comprises an alcohol solvent having a boiling point of 180-240° C.

5. The multilayer coating film-forming method according to claim 4, in which the alcohol solvent is selected from the group consisting of 1-octanol, 2-octanol, 2-ethyl-1-hexanol and ethylene glycol mono-2-ethylhexyl ether.

6. The multilayer coating film-forming method according to claim 1, in which the solid content of the base coating film is adjusted to 75-100 mass % in the step (4).

7. The multilayer coating film-forming method according to claim 1, in which the carboxy-containing compound in the clear paint (Z) has an acid value within a range of 50-500 mgKOH/g.

8. The multilayer coating film-forming method according to claim 1, in which the carboxy-containing compound in the clear paint (Z) has a weight-average molecular weight within a range of 2,000-3,000.

9. The multilayer coating film-forming method according to claim 1, in which the polyepoxide in the clear paint (Z) comprises epoxy groups within a range of 0.8-15 mmol/g.

10. The multilayer coating film-forming method according to claim 1, in which the polyepoxide in the clear paint (Z) has a weight-average molecular weight within a range of 1,000-20,000.

11. The multilayer coating film-forming method according to claim 1, in which a blend ratio of the carboxy-containing compound and polyepoxide in the clear paint (Z) lies within a range of 1/0.5-0.5/1, in terms of the equivalent ratio between the carboxy groups in the carboxy-containing compound and epoxy groups in the polyepoxide.

12. The multilayer coating film-forming method according to claim 1, in which the maximum storage modulus (G'1) of the clear paint (Z) is within a range of 0.005-20 Pa.

13. The multilayer coating film-forming method according to claim 1, in which the coating object is a car body on which an undercoat is formed with electrodeposition paint.

* * * * *